(12) United States Patent
Chernoff

(10) Patent No.: US 8,123,196 B1
(45) Date of Patent: Feb. 28, 2012

(54) INTEGRATED VALVE SYSTEM

(76) Inventor: Larry J. Chernoff, Calgary (CA)

( * ) Notice: Subject to any disclaimer, the term of this patent is extended or adjusted under 35 U.S.C. 154(b) by 342 days.

(21) Appl. No.: 12/587,426

(22) Filed: Oct. 7, 2009

(51) Int. Cl.
*F16K 31/00* (2006.01)

(52) U.S. Cl. ........ 251/228; 251/229; 251/251; 251/298; 251/335.1

(58) Field of Classification Search ............ 251/129.11, 251/228–229, 296, 298, 303, 335.1
See application file for complete search history.

(56) References Cited

U.S. PATENT DOCUMENTS

| | | | | |
|---|---|---|---|---|
| 701,615 A | * | 6/1902 | Reichenbach | 251/335.3 |
| 2,313,128 A | * | 3/1943 | Densten | 251/335.1 |
| 3,532,121 A | * | 10/1970 | Sciortino et al. | 251/129.17 |
| 3,570,807 A | * | 3/1971 | Sturman et al. | 251/65 |
| 3,614,057 A | * | 10/1971 | Hospe | 251/251 |
| 3,685,794 A | * | 8/1972 | Henning | 251/303 |
| 4,085,952 A | * | 4/1978 | Sharples | 251/298 |
| 5,197,712 A | * | 3/1993 | Engelhardt | 251/297 |
| 5,314,164 A | * | 5/1994 | Smith | 251/335.2 |
| 5,901,741 A | * | 5/1999 | Mudd et al. | 251/85 |
| 5,913,505 A | * | 6/1999 | Ouvrard et al. | 251/303 |
| 6,626,420 B2 | * | 9/2003 | Amidzich | 251/231 |
| 7,004,449 B2 | * | 2/2006 | Jansen | 251/129.07 |

FOREIGN PATENT DOCUMENTS

CA 2504863 A1 * 10/2006

* cited by examiner

*Primary Examiner* — John Bastianelli

(57) ABSTRACT

A fluid chamber couples cylindrical input and output lines. The chamber has a closed lower end and an open upper end. A closure plate covers the upper end. The plate has a primary and secondary slots. A finger assembly has primary and secondary fingers. The fingers extend through the slots with upper ends of the fingers above the chamber and lower ends within the chamber. A block, fabricated of elastomeric material, couples the fingers at intermediate extents of the fingers. The block is positioned upon the closure plate. The elastomeric material covers the lower ends of the fingers. An aperture has a spacer. The aperture is formed in the lower end of the primary finger in axial alignment with the output line. A drive mechanism moves the upper ends of the fingers to pivot the lower ends of the fingers.

4 Claims, 4 Drawing Sheets

FIG 7
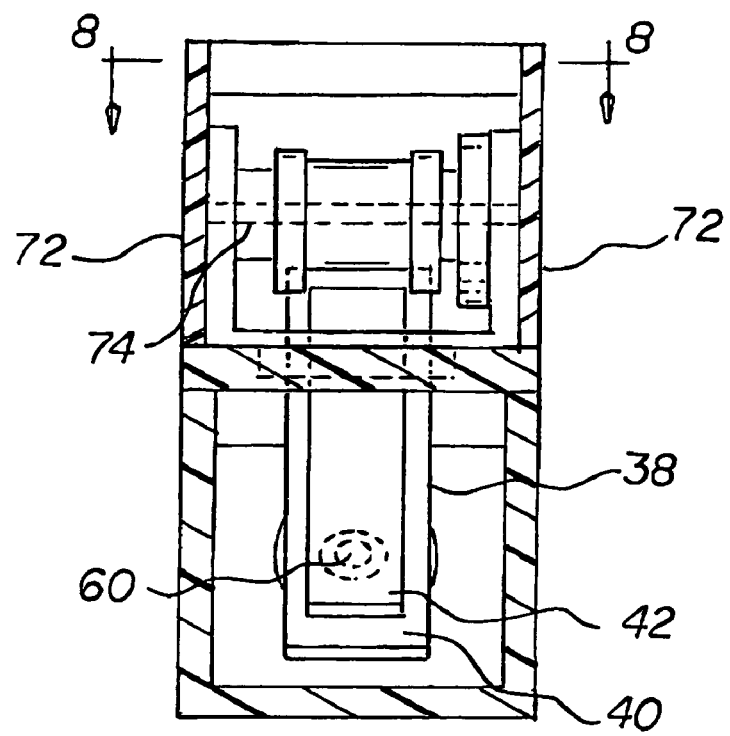
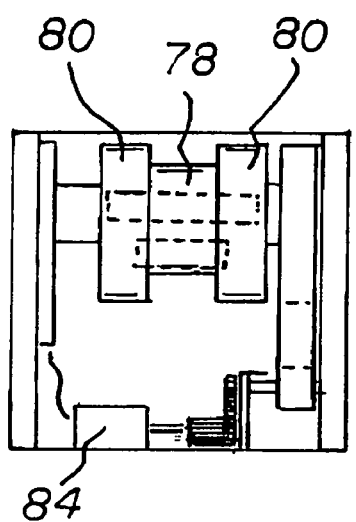
FIG 8

INTEGRATED VALVE SYSTEM

BACKGROUND OF THE INVENTION

1. Field of the Invention

The present invention relates to an integrated valve system and more particularly pertains to selectively discharging contaminant material from the bottom of a filtering tank, in a safe, reliable and economical manner.

2. Description of the Prior Art

The use of valve systems of known designs and configurations is known in the prior art. More specifically, valve systems of known designs and configurations previously devised and utilized for the purpose of discharging material from a tank through known methods and apparatuses are known to consist basically of familiar, expected, and obvious structural configurations, notwithstanding the myriad of designs encompassed by the crowded prior art which has been developed for the fulfillment of countless objectives and requirements.

By way of example, Canadian Patent Number 2,504,863 issued Oct. 10, 2006 to Chernoff relates to an Integrated Valve System.

While this device fulfills its particular objectives and requirements, the aforementioned patent does not describe an integrated valve system that allows for selectively discharging contaminant material from the bottom of a filtering tank, in a safe, reliable and economical manner.

In this respect, the integrated valve system according to the present invention substantially departs from the conventional concepts and designs of the prior art, and in doing so provides an apparatus primarily developed for the purpose of selectively discharging contaminant material from the bottom of a filtering tank, in a safe, reliable and economical manner.

Therefore, it can be appreciated that there exists a continuing need for a new and improved integrated valve system which can be used for selectively discharging contaminant material from the bottom of a filtering tank, in a safe, reliable and economical manner. In this regard, the present invention substantially fulfills this need.

SUMMARY OF THE INVENTION

In view of the foregoing disadvantages inherent in the known types of valve systems of known designs and configurations now present in the prior art, the present invention provides an improved integrated valve system. As such, the general purpose of the present invention, which will be described subsequently in greater detail, is to provide a new and improved integrated valve system and method which has all the advantages of the prior art and none of the disadvantages.

To attain this, the present invention essentially comprises an integrated valve system. First provided is a cylindrical input line. A cylindrical output line is provided. A rectilinear fluid chamber is also provided. The fluid chamber operatively couples the input and output lines. The input and output lines have axes. The axes are provided in a vertical plane. The input and output lines are coaxial. The chamber has a vertical axis. The vertical axis provided midway between the input and output lines. The vertical axis is provided in the plane of the axes of the input and output lines.

The chamber has an upper end and a lower end. The chamber has a lower cap. The lower cap seals the lower end of the chamber. The upper end has a reception section. The upper end has an interior closure plate. The interior closure plate has a broad slot. The interior closure plate also has a parallel narrow slot. The slots are provided in a generally T-shaped configuration. The closure plate has a rectangular recess. The recess is provided above the slots.

A finger assembly is provided. The finger assembly is formed of fingers. The fingers include a broad finger. The fingers also include a narrow finger. The broad finger extends through the broad slot. The broad finger has an upper end. The upper end is provided above the chamber. The broad finger has a lower end. The lower end is provided within the chamber perpendicular to the input and output lines. The narrow finger extends through the narrow slot. The narrow finger has an upper end. The upper end is provided above the chamber. The narrow finger has a lower end. The lower end is provided within the chamber perpendicular to the input and output lines.

The finger assembly includes a rectilinear block. The block is formed of an elastomeric material. The block couples the fingers at an intermediate extent of the fingers. The fingers are provided in spaced relationship with each other. The block is positioned within the rectangular recess. The elastomeric material extends downwardly. In this manner the lower ends of the fingers are covered.

Provided next is a circular aperture. The circular aperture has a metal grommet. The metal grommet extends through the lower end of the broad finger in axial alignment with the axis of the output line. The fingers are movable between a fully vertical closed position, an intermediate position and a fully pivoted open position. In the fully vertical closed position, the broad finger is provided in contact with the output line and the narrow finger in contact with the grommet. Note FIG. 4. In the intermediate position, the broad finger is provided in contact with the output line and the narrow finger pivoted to out-of-contact with the grommet. Note FIG. 5. In the fully pivoted open position, the broad finger is pivoted to out-of-contact with the output line and the narrow finger pivoted and in contact with the grommet. Note FIG. 6.

Further provided is a housing. The housing has a lower section. The lower section is coupled to the reception section of the chamber. In this manner the finger assembly is secured in operative position with respect to the chamber. The housing has upwardly extending parallel faces. The housing has a drive shaft. The drive shaft is rotatably supported in the parallel faces. The housing has a cam. The cam has a central lobe. The central lob is movable into contact with the upper end of the narrow finger. In this manner the lower end of the narrow finger may be pivoted from the closed position to the intermediate position. The cam has laterally spaced lobes. The laterally spaced lobes are movable into contact with the upper end of the broad finger. In this manner the lower end of the broad finger may be pivoted to the fully pivoted open position.

Provided last is a motor. The motor rotates the cam and the fingers between the open and closed positions. The motor further holds the cam and fingers in the position in which they were last positioned upon terminating the motor.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved integrated valve system which has all of the advantages of the prior art valve systems of known designs and configurations and none of the disadvantages.

It is another object of the present invention to provide a new and improved integrated valve system which may be easily and efficiently manufactured and marketed.

It is further object of the present invention to provide a new and improved integrated valve system which is of durable and reliable constructions.

An even further object of the present invention is to provide a new and improved integrated valve system which is susceptible of a low cost of manufacture with regard to both materials and labor, and which accordingly is then susceptible of low prices of sale to the consuming public, thereby making such integrated valve system economically available to the buying public.

Even still another object of the present invention is to provide an integrated valve system for selectively discharging contaminant material from the bottom of a filtering tank, in a safe, reliable and economical manner.

Lastly, it is an object of the present invention to provide a new and improved integrated valve system. Cylindrical input and output lines are provided. A fluid chamber couples the lines. The chamber has a closed lower end and an open upper end. A closure plate covers the upper end. The plate has a primary and secondary slots. A finger assembly has primary and secondary fingers. The fingers extend through the slots with upper ends of the fingers above the chamber and lower ends within the chamber. A block, fabricated of elastomeric material, couples the fingers at intermediate extents of the fingers. The block is positioned upon the closure plate. The elastomeric material covers the lower ends of the fingers. An aperture has a spacer. The aperture is formed in the lower end of the primary finger in axial alignment with the output line. A drive mechanism moves the upper ends of the fingers to pivot the lower ends of the fingers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a cross sectional view taken along line 7-7 of FIG. 6.

FIG. 8 is a cross sectional view taken along line 8-8 of FIG. 7.

The same reference numerals refer to the same parts throughout the various Figures.

DESCRIPTION OF THE PREFERRED EMBODIMENT

Figure 1:
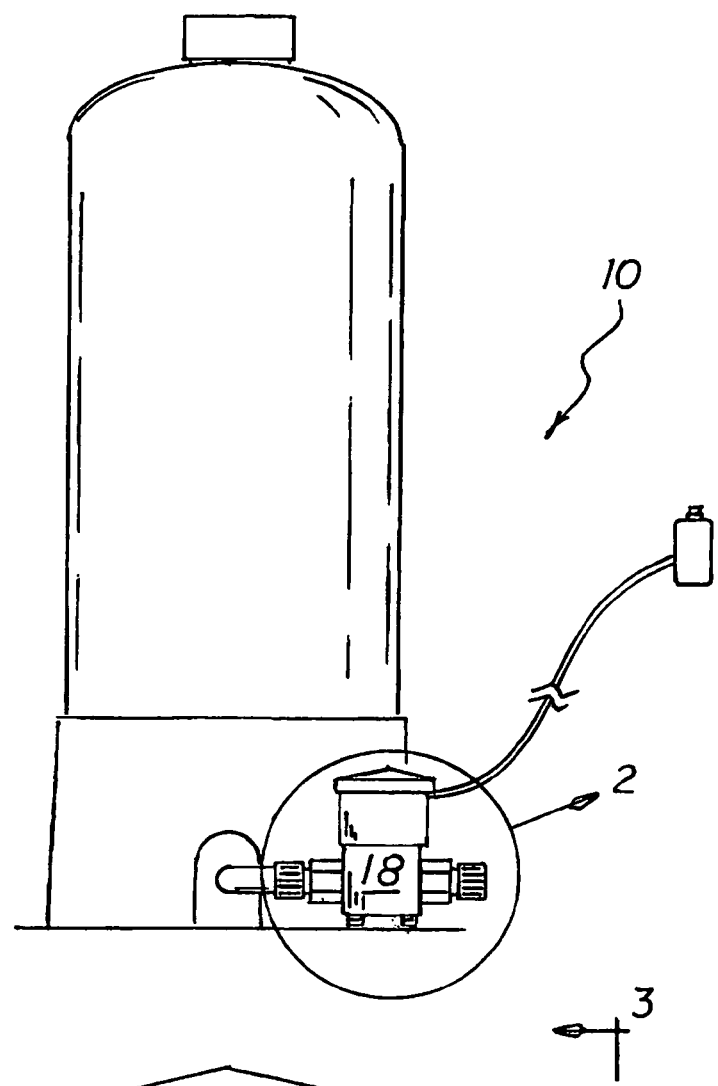
FIG. 1 is a front elevational view of an integrated valve system constructed in accordance with the principles of the present invention.
Figure 2:
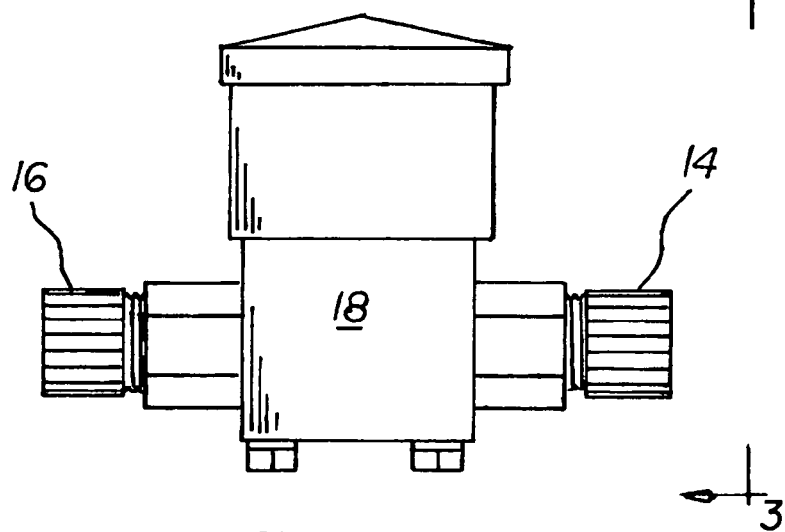
FIG. 2 is an enlarged elevational view taken at circle 2 of FIG. 1.
Figure 3:
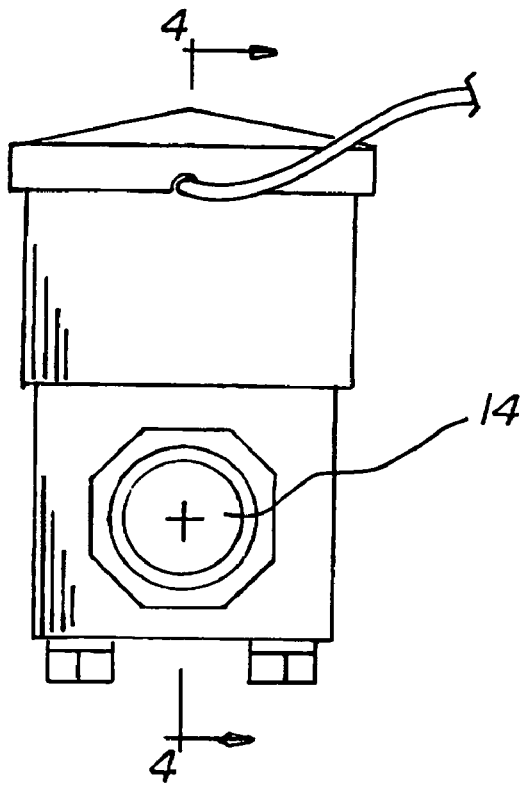
FIG. 3 is a left side elevational view taken at line 3-3 of FIG. 2.

With reference now to the drawings, and in particular to FIG. 1 thereof, the preferred embodiment of the new and improved integrated valve system embodying the principles and concepts of the present invention and generally designated by the reference numeral 10 will be described.

The present invention, the integrated valve system 10 is comprised of a plurality of components. Such components in their broadest context include cylindrical input and output lines, a finger assembly, a block, an aperture and a drive mechanism. Such components are individually configured and correlated with respect to each other so as to attain the desired objective.

First provided is a cylindrical input line 14. A cylindrical output line 16 is provided. A rectilinear fluid chamber 18 is also provided. The fluid chamber operatively couples the input and output lines. The input and output lines have axes. The axes are provided in a vertical plane. The input and output lines are coaxial. The chamber has a vertical axis. The vertical axis provided midway between the input and output lines. The vertical axis is provided in the plane of the axes of the input and output lines.

The chamber has an upper end and a lower end. The chamber has a lower cap 22. The lower cap seals the lower end of the chamber. The upper end has a reception section 24. The upper end has an interior closure plate 26. The interior closure plate has a broad slot 28. The interior closure plate also has a parallel narrow slot 30. The slots are provided in a generally T-shaped configuration. The closure plate has a rectangular recess 32. The recess is provided above the slots.

A finger assembly 38 is provided. The finger assembly is formed of fingers. The fingers include a broad finger 40. The fingers also include a narrow finger 42. The broad finger extends through the broad slot. The broad finger has an upper end 44. The upper end is provided above the chamber. The broad finger has a lower end 46. The lower end is provided within the chamber perpendicular to the input and output lines. The narrow finger extends through the narrow slot. The narrow finger has an upper end 48. The upper end is provided above the chamber. The narrow finger has a lower end 50. The lower end is provided within the chamber perpendicular to the input and output lines.

The finger assembly includes a rectilinear block 54. The block is formed of an elastomeric material. The block couples the fingers at an intermediate extent of the fingers. The fingers are provided in spaced relationship with each other. The block is positioned within the rectangular recess. The elastomeric material extends downwardly. In this manner the lower ends of the fingers are covered.

Figure 4:
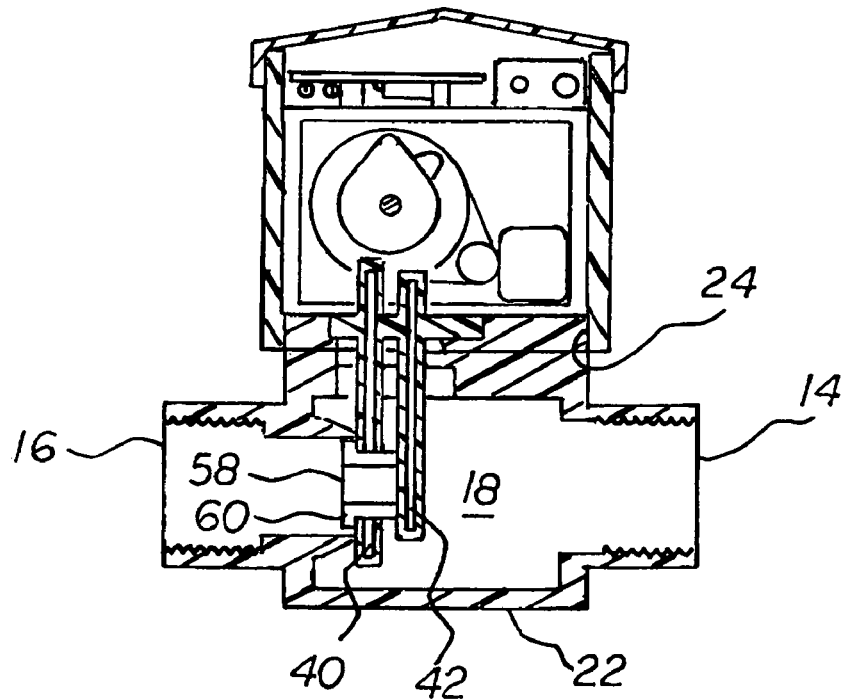
FIG. 4 is a cross sectional view taken along line 4-4 of FIG. 3.
Figure 5:
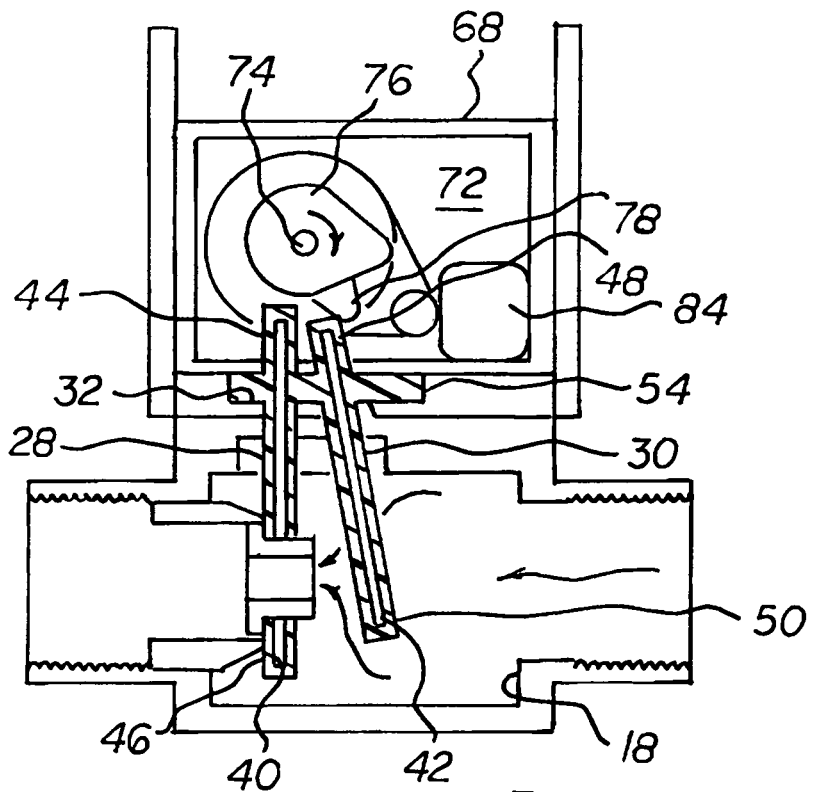
FIG. 5 is a cross sectional view similar to FIG. 4 but with a valve in a partially open orientation.
Figure 6:
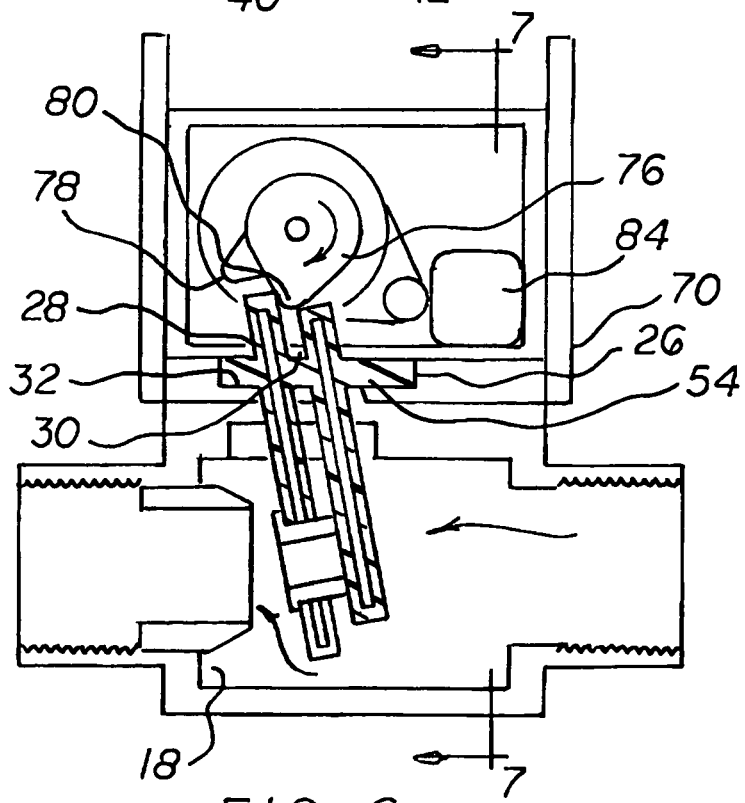
FIG. 6 is a cross sectional view similar to FIG. 4 but with a valve in a fully open orientation.

Provided next is a circular aperture 58. The circular aperture has a metal grommet 60. The metal grommet extends through the lower end of the broad finger in axial alignment with the axis of the output line. The fingers are movable between a fully vertical closed position, an intermediate position and a fully pivoted open position. In the fully vertical closed position, the broad finger is provided in contact with the output line and the narrow finger in contact with the grommet. Note FIG. 4. In the intermediate position, the broad finger is provided in contact with the output line and the narrow finger pivoted to out-of-contact with the grommet. Note FIG. 5. In the fully pivoted open position, the broad finger is pivoted to out-of-contact with the output line and the narrow finger pivoted and in contact with the grommet. Note FIG. 6.

Further provided is a housing 68. The housing has a lower section 70. The lower section is coupled to the reception section of the chamber. In this manner the finger assembly is secured in operative position with respect to the chamber. The housing has upwardly extending parallel faces 72. The housing has a drive shaft 74. The drive shaft is rotatably supported in the parallel faces. The housing has a cam 76. The cam has a central lobe 78. The central lob is movable into contact with the upper end of the narrow finger. In this manner the lower end of the narrow finger may be pivoted from the closed position to the intermediate position. The cam has laterally spaced lobes 80. The laterally spaced lobes are movable into contact with the upper end of the broad finger. In this manner the lower end of the broad finger may be pivoted to the fully pivoted open position.

Provided last is a motor 84. The motor rotates the cam and the fingers between the open and closed positions. The motor further holds the cam and fingers in the position in which they were last positioned upon terminating the motor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An integrated valve system comprising:
    cylindrical input and output lines and a fluid chamber coupling the lines, the chamber having a closed lower end and an open upper end, a closure plate covering the upper end, the closure plate being formed with slots, the slots being a primary slot and a secondary slot;
    a finger assembly formed of fingers, the fingers being a primary finger and a secondary finger, the fingers extending through the slots with upper ends of the fingers above the chamber and lower ends within the chamber;
    a block fabricated of elastomeric material, the block coupling the fingers at intermediate extents of the fingers with the fingers in spaced, normally parallel relationship, the block being positioned upon the closure plate, the elastomeric material covering the lower ends of the fingers;
    an aperture with a spacer, the aperture being formed in the lower end of the primary finger in axial alignment with the output line; and
    a drive mechanism to move the upper ends of the fingers to pivot the lower ends of the fingers.

2. The system as set forth in claim 1 wherein the primary finger is a broad finger and the secondary finger is a narrow finger.

3. The system as set forth in claim 1 and the drive mechanism including:
    a cam; and
    a motor to rotate the cam and the fingers between an open and a closed position and to hold the cam and fingers in the position in which they were last positioned upon terminating the motor.

4. An integrated valve system for selectively discharging contaminant material from the bottom of a filtering tank, the system comprising, in combination:
    a cylindrical input line and a cylindrical output line and a rectilinear fluid chamber operatively coupling the input and output lines, the input and output lines having axes in a vertical plane with the input and output lines being coaxial, the chamber having a vertical axis midway between the input and output lines in the plane of the axes of the input and output lines;
    the chamber having an upper end and a lower end with a lower cap sealing the lower end of the chamber, the upper end having a reception section and an interior closure plate, the interior closure plate being formed with a broad slot and a parallel narrow slot, the slots being in a generally T-shaped configuration, the closure plate being formed with a rectangular recess above the slots;
    a finger assembly formed of fingers, the fingers being a broad finger and a narrow finger, the broad finger extending through the broad slot with an upper end above the chamber and a lower end within the chamber perpendicular to the input and output lines, the narrow finger extending through the narrow slot with an upper end above the chamber and a lower end within the chamber perpendicular to the input and output lines;
    the finger assembly including a rectilinear block formed of an elastomeric material, the block coupling the fingers at an intermediate extent of the fingers with the fingers in spaced relationship with each other, the block being positioned within the rectangular recess, the elastomeric material extending downwardly to cover the lower ends of the fingers;
    a circular aperture with a metal grommet extending through the lower end of the broad finger in axial alignment with the axis of the output line, the fingers being movable between a fully vertical closed position with the broad finger in contact with the output line and the narrow finger in contact with the grommet, an intermediate position with the broad finger in contact with the output line and the narrow finger pivoted to out-of-contact with the grommet, and a fully pivoted open position with the broad finger pivoted to out-of-contact with the output line and the narrow finger pivoted and in contact with the grommet;

a housing having a lower section coupled to the reception section of the chamber for securing the finger assembly in operative position with respect to the chamber, the housing having upwardly extending parallel faces, a drive shaft rotatably supported in the parallel faces, a cam with a central lobe movable into contact with the upper end of the narrow finger for pivoting the lower end of the narrow finger from the closed position to the intermediate position, the cam having laterally spaced lobes movable into contact with the upper end of the broad finger for pivoting the lower end of the broad finger to the fully pivoted open position; and a motor to rotate the cam and the fingers between the open and closed positions and to hold the cam and fingers in the position in which they were last positioned upon terminating the motor.

* * * * *